United States Patent [19]

Kokei

[11] 4,138,698

[45] Feb. 6, 1979

[54] MAGNETIC TAPE CONTROL SYSTEM

[75] Inventor: Akira Kokei, Moriguchi, Japan

[73] Assignee: Matsushita Electric Industrial Co., Ltd., Kadoma, Japan

[21] Appl. No.: 842,872

[22] Filed: Oct. 17, 1977

[30] Foreign Application Priority Data

Oct. 20, 1976 [JP] Japan .............................. 51-141805[U]

[51] Int. Cl.$^2$ ............................................. G11B 15/48
[52] U.S. Cl. ................................................... 360/74
[58] Field of Search ........................... 360/74; 242/191

[56] References Cited

U.S. PATENT DOCUMENTS 3,573,392  4/1971  Trammell ................................. 360/74
3,583,617  6/1971  Kosaka .................................... 360/74

*Primary Examiner*—Robert S. Tupper
*Attorney, Agent, or Firm*—Wenderoth, Lind & Ponack

[57] ABSTRACT

The present invention is a magnetic tape recording and reproduction device. Movement of the magnetic tape is controlled by a tape control system in which the tape is forwarded by a tape forwarding means, and is stopped at its end by an automatic tape stopping means upon detection of transparent tape portion which is provided at opposite ends of the tape. While the tape is forwarded, the tape may be temporarily stopped by a tape pausing means and moved again by the release of this means. The tape control system includes a delay circuit which maintains the automatic tape stopping means in an off-state for preventing the detection of the transparent tape portion therewith for a predetermined period of time after the tape is forwarded by the forwarding means or by the release of the tape pausing means.

5 Claims, 3 Drawing Figures

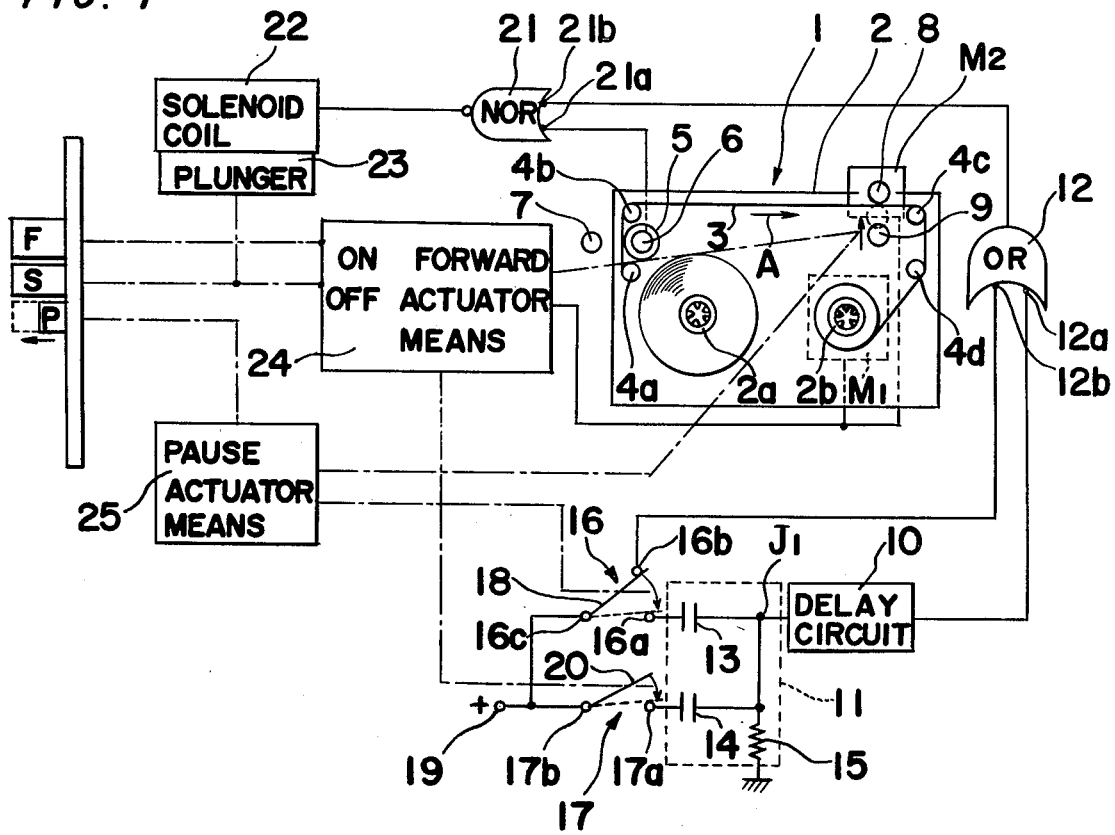
FIG. 1
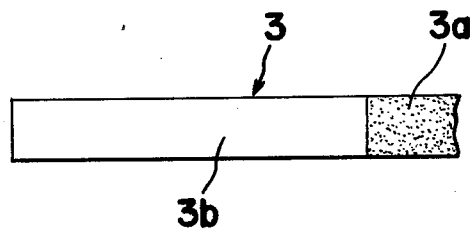
FIG. 2
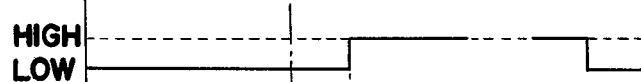
FIG. 3
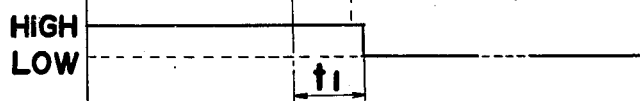
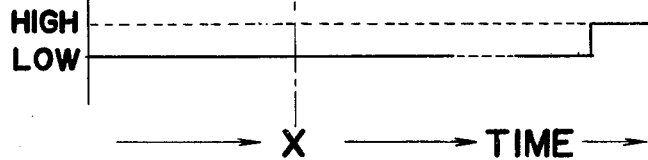

MAGNETIC TAPE CONTROL SYSTEM

BACKGROUND OF THE INVENTION

The present invention relates to a magnetic tape recording and/or reproducing device such as tape recorder, and more particularly, to an improvement in a tape control system employed in such a device.

In some conventional magnetic tape recorders, there is provided a tape control system of the above described type including a pause switch or button. Upon pressing the pause switch or button, the forwarding of the tape is temporarily stopped without turning off the function of the tape recorder. On the assumption that the tape recorder is ready to record a certain sound, the operator first turns on the main switch, and then pushes a button or buttons such as the forwarding button which is necessary to start recording the sound. In order to check the input level of the sound, the pause button is then pushed for temporarily stopping the forwarding of the tape. While the tape is temporarily stopped, the sound is properly supplied to the tape recorder, and the tape recorder functions so as to show the input level of the sound. After checking the input level, the pause button is released for forwarding the tape.

In addition to the pause button, the tape control system of the conventional type may include an automatic tape stopper which automatically detects the end of the tape and completely turns off the tape recorder. The automatic tape stopper includes a means for detecting the end of the tape. Since recent magnetic tapes are usually constructed of an opaque magnetic tape portion where the sound is recorded and a transparent tape portion at opposite ends of the magnetic tape, the end detecting means is usually formed by a light source and a photosensitive member which are positioned so that the tape moves past the space formed between the light source and the photosensitive member. While the opaque magnetic tape portion moves past the end detecting means, a low level signal is produced therefrom to continue the forwarding operation of the tape and when, at the end of the tape, the transparent tape portion is introduced into the end detecting means, a high level signal is produced therefrom to immediately stop forwarding the tape.

However, according to this arrangement of the conventional tape control system as described above, the end detecting means not only detects the end of the tape, but also detects the beginning of the tape, since the beginning of the tape is also formed by the transparent tape. Accordingly, at the beginning of a tape, the forwarding operation of the tape may be interrupted by the end detecting means. Therefore, in the tape recorders or the like employing this type of tape control system, the operator, at the beginning of the tape, has to move the tape until the transparent tape portion has moved past the end detecting means. This operation of moving the tape gives rise to a disadvantage in operating the tape recorder, particularly when the tape is presented in a casing such as in casette tape, cartridge tape or in magazine tape.

In order to overcome these disadvantages as described above, there have been conventionally proposed various types of tape control systems one type of which is to arrange the end detecting means to become energized a predetermined period of time after turning on the forwarding button. In this arrangement, the light source is lit after the transparent tape provided at the beginning of the tape has moved past the end detecting means.

Another conventional type of tape control system includes means for intercepting the signal obtained from the end detecting means for a predetermined period of time after turning on the forwarding button. In this arrangement, the end detecting means starts functioning after the transparent tape provided at the beginning of the tape has moved past the end detecting means.

However, in either one of these conventional tape control system, there arises a drawback which interrupts the forwarding of the tape when the pause button is pushed before the transparent tape provided at the beginning completely moves past the end detecting means. More particularly, when the pause button is pushed immediately after or simultaneously with the pushing of the forwarding button, the end detecting device will start functioning after the predetermined period of time. Thus the release of the pause button after the predetermined period of time has passed would not duly forward the tape since the end detecting means operates upon detection of the transparent tape provided at the beginning of the tape.

SUMMARY OF THE INVENTION

Accordingly, it is a primay object of the present invention to provide an improved magnetic tape control system in which the tape forwarding is immediately stopped upon pushing the pause button and the tape forwarding starts immediately upon release of the pause button regardless of the position of the tape.

It is another object of the present invention to provide an improved magnetic tape control system of the above described type which is simple in construction and can be readily manufactured at low cost.

In order to accomplish these and other objects, the tape control system of the present invention employing magnetic tape provided with a leading portion such as transparent tape at opposite ends thereof comprises a forwarding means for forwarding the tape, a means for temporarily pausing the forwarding of the tape, a means for automatically interrupting the forwarding of the tape at the end of the tape by the detection of the leading tape and a delay circuit connected to the forwarding means and the pausing means for delaying the actuation of the interrupting means a predetermined period of time after the tape is forwarded by the actuation of the forwarding means or by the release of the pausing means. With such construction as described above, the interrupting means is prevented from being actuated as to interrupt the forwarding of the tape by the detection of the leading tape provided at the beginning of the tape.

BRIEF DESCRIPTION OF THE DRAWINGS

These and other objects and features of the present invention will become apparent from the following description taken in conjunction with preferred embodiment thereof with reference to the accompanying drawings, in which;

FIG. 1 is a schematical view of a tape control system of the present invention showing a block diagram thereof and also a portion of the structure of a casette tape;

FIG. 2 is an enlarged fragmentary sectional view of the tape provided in the casette; and FIG. 3 is a graph showing outputs obtained from main parts of the circuit component shown in FIG. 1 in relation to the time.

DETAILED DESCRIPTION OF THE INVENTION

Before the description of the present invention proceeds, it should be noted that a cassette tape to be employed in a tape recorder having a tape control system of the present invention is first described fully in connection with FIGS. 1 and 2.

Referring first to FIG. 1, the reference numeral 1 designates a casette tape for use in a recording device such as tape recorder. The casette tape 1 has a casing 2, supply and take-up reels 2a and 2b each rotatably mounted in the casing 2 and a tape 3 wound on the reels 2a and 2b. The opposite ends of the tape 3 are tightly connected to the reels 2a and 2b, respectively, while the intermediate tape portion extending between the reels 2a and 2b is passed around four guide rolls 4a, 4b, 4c and 4d. The tape 3, as best shown in FIG. 2 has at least the opposite end portions thereof formed by a transparent tape 3b while the intermediate tape portion therebetween is formed by a recording tape such as an opaque magnetic tape 3a. This transparent tape can be provided at one or more places in the intermediate portions of the opaque magnetic tape 3a. However, the description hereinbelow is particularly directed to the tape having transparent tape portions only at opposite ends thereof.

Referring again to FIG. 1, the casing 2 has an opening 5 formed in one corner portion for accommodating therein, when the casette tape 1 is placed in the tape recorder, a photosensitive member 6 such as phototransistor fixedly provided in the tape recorder in such a manner as to have the light receiving surface face the tape 3 which runs closely adjacent thereto. The tape recorder also has a light source 7 such as lamp provided adjacent to the photosensitive member 6 which positions the tape 3 between the light source 7 and the photosensitive member 6. When the transparent tape 3b runs between the light source 7 and the photosensitive member 6, the light emitted from the light source 7 is transmitted to the photosensitive member 6 through the transparent tape 3b, and thus the photosensitive member 6 produces a low level signal. When the magnet tape 3a intercepts the light passing therebetween, the photosensitive member 6 produces a high level signal. These signals are applied to the first input 21a of NOR circuit 21 included in the tape control system of the present invention.

The tape recorder also includes a driving roll 8 which is driven by a first driving means $M_1$ and a pinch roll 9. Pinch roll 9 may to move between a pinched position, as shown by the dotted lines in FIG. 1, where the tape is tightly pinched between the driving roll 8 and the pinch roll 9 to run the tape in the direction indicated by the arrow A at the proper speed and a detached position, as shown by the solid lines, where the tape is released from the pinched position to stop the running the tape. While the pinch roll 9 is in the pinched position, the tape 3 continuously transmitted thereby is wound on the take up reel 2b which is driven by a second driving means $M_2$. It is to be noted that the torque of the second driving means $M_2$ is not so large as to drive the reel 2b while the pinch roll 9 is in the detached position.

Still referring to FIG. 1, there is shown a block diagram of the tape control system of the present invention, in which among the various components, the chain lines indicate mechanical connections, while the solid lines indicate electrical connections. First, the electrical connections are described hereinbelow.

The electrically connected part of the tape control system of the present invention includes a delay circuit 10 formed by a monostable multivibrator which has an input thereof connected to a pulse producer 11 and an output thereof connected to the first input 12a of an OR circuit 12. The pulse producer 11 includes two capacitors 13 and 14 which are connected to each other at a common junction $J_1$ and a resistor 15 which is connected between the common junction $J_1$ and ground for forming a differential circuit. The capacitor 13 is also connected to a switch 16 at a terminal 16a thereof while the capacitor 14 is connected to a switch 17 at a terminal 17a thereof. The switch 16 includes three terminals 16a, 16b and 16c and an arm member 18 extending from the terminal 16c. The terminal 16b is connected to a second input 12b of the OR circuit 12 and the terminal 16c is connected to a power source 19 which continuously produces a high level signal. The arm member 18 is movably provided to terminate between a first position, namely the pause position, where the arm member 18 connects the terminals 16c and 16b and a second position, namely the released position, where arm member 18 connects the terminal 16a and 16c. The switch 17 includes two terminals 17a and 17b and an arm member 20 extending from the terminal 17b. The terminal 17b is connected to the power source 19. The arm member 20 is movably provided to terminate between the on position where the arm member 20 connects the terminals 17a and 17b and the off position where the arm member 20 disconnects the terminal 17a from the terminal 17b.

When either the switch 16 is turned to the released position or the switch 17 is turned to the on position as indicated by the dotted lines, the pulse producer 11 produces a sharp differentiated pulse for application to the delay circuit 10 which in turn produces a single shot pulse having a duration of $t_1$ sec. Note that $t_1$ sec. is longer than the period of time necessary for the entire transparent tape 3a to move pass between the photosensitive member 6 and the light source 7 at the minimum tape speed provided for recording and reproducing operations.

The OR circuit 12 has the output thereof connected to the second input 21b of the NOR circuit 21. The output of the NOR circuit is connected to a solenoid coil 22 having a plunger member 23 reciprocally provided therein.

The mechanically connected part of the tape control system of the present invention comprises the plunger member 23, a forward actuator means 24 of known type, a pause actuator means 25 and an array of switch buttons; a forward button F, a stop button S and a pause button P. The forward button F is mechanically connected with the forward actuator means 24 which is electrically connected to the first and second driving means $M_1$ and $M_2$ and is mechanically connected with the pinch roll 9 and the arm member 20 in the switch 17. Note that the forward actuator means 24 is further connected to the other various components such as the recording head (not shown) which are necessary to effect the recording or reproducing operations of the tape recorder. When the forward button F is pushed, the forward actuator means 24 is so energized as to drive the first and second driving means $M_1$ and $M_2$, to shift the pinch roll 9 toward the pinched position, and also to turn on the switch 17. The stop button S is also in contact with the forward actuator means 24. When the stop button S is pushed, the forward actuator means 24, which has been actuated by the forward button F, returns to the stopped position, that is, as far as the present invention is concerned, the driving means $M_1$ and $M_2$ are stopped, the pinch roll 9 is returned back to the detached position and also the switch 17 is turned off. The plunger member 23 of the solenoid coil 22 is also mechanically connected with the forward actuator means 24 in a manner similar to the stop button S is mechanically connected with the forward actuator means 24. When the solenoid coil 22 is energized by the high level signal obtained from the NOR circuit 21 to pull in the plunger member 23, the forward actuator means 24 takes the same action as the action taken by the actuation of the stop button S. The pause button P is mechanically connected with the pause actuator means 24 which is mechanically connected with the pinch roll 9 and the switch 16. When the pause button P is pushed, as shown by the solid lines, the pinch roll 9 is shifted to the detached position and the switch 16 is turned to the pause position. When the pause button P is pulled back to the initial position, as shown by the dotted line, the pinch roll 9 is shifted to the pinched position and the switch 16 is moved to the released position.

The tape control system of the present invention as described above operates in a manner described hereinbelow.

For the purpose of fully describing the operation of the tape control system, it is supposed that the tape recorder is, at the beginning, presented in off state, in other words, the buttons F, S and P are all presented at pulled position, and that the casette tape 1 employed in the tape recorder has the tape 3 completely wound on the reel 2a. After turning on the main switch (not shown) of the tape recorder and upon pushing the forward button F, the tape 3 is forwarded by the driving force of the driving means $M_1$ and $M_2$ and by the pinch roll 9 placed in the pinched position. At the same time, the switch 17 is turned on for producing a pulse from the pulse producer 11 and thus, the delay circuit 10 produces a single-shot pulse therefrom maintaining a high level for a duration of $t_1$ sec. This single-shot pulse is applied to the input 12a of the OR circuit 12 which in turn produces a high level signal therefrom for the duration of $t_1$ sec. which is applied to the NOR circuit 21. On the other hand, upon turning on the tape recorder, the light source 7 is actuated to produce light. This light is transmitted through the transparent tape 3b towards the photosensitive member 6 which thus produces a low level signal which is applied to the NOR circuit 21. The NOR circiut 21, now having respective low and high level signals applied to its two inputs, produces a low level signal for application to the solenoid coil 22. Solenoid coil 22 accordingly maintains the plunger member 23 in a de-energized or projected position so that the forward actuator means 24 is still maintained in the on state to wind the tape 3 on the reel 2b. After the transparent tape 3b has moved past the space between the light source 7 and the photosensitive member 6, the opaque magnetic tape 3c appears therebetween for intercepting the light. At this moment, the signal being produced by the photosensitive member 6 is changed from a low level to a high level. At this moment, the OR circuit 12 still produces a high level signal due to the high level pulse produced by the delay circuit 10. Thus, the NOR circuit 21 still produces a low level signal to continue to wind tape 3 on the reel 2b.

After $t_1$ seconds, the signal applied to the input 12a of the OR circuit 12 is changed from a high to a low level signal. Therefore, OR circuit 12 produces a low level signal output which is applied to the NOR circuit 21. Thus, the NOR circuit 21 still produces a low level signal due to the high level signal from photosensitive member 6 and the tape 3 continue to be forwarded for carrying out the recording or reproducing operation.

After the tape 3 has been forwarded and at the moment when the leading edge of the transparent tape 3b provided at the end of the tape 3 appears between the light source 7 and the photosensitive member 6, the photosensitive member 6 changes its output signal from a high level to a low level upon receipt of light emitted from the light source 7. Accordingly, the NOR circuit 21 receives respective low level signals at the two inputs 21a and 21b. Thus NOR circuit 21 produces a high level signal which is applied to the solenoid coil 22 to pull in the plunger member 23. Thereupon, the plunger member 23 operates so as to interrupt the actuation of the forward actuator means 24, thus completing the operation of forwarding the tape.

Although the foregoing description is directed to the case where the tape 3 is incessantly forwarded without using the operation of the pause button P, the description hereinbelow is directed to several cases where the pause button P is pushed before or while the tape 3 is forwarded.

The first case which is described in connection with FIG. 3 is when the pause button P is pushed before or simultaneously with the pushing of the forward button F at the very beginning of the operation where the tape 3 is completely wound on the reel 2a. In this case the driving means $M_1$ and $M_2$ are properly operated to rotate the driving roll 8 and to give a suitable torque to the reel 2b. However, the pushing of the pause button P prevents movement the pinch roll 9 to the pinched position. In other words, the pinch roll 9 is maintained in the detached position, so that the tape 3 is not forwarded. This case usually occurs when the operator wishes to check the input level of the sound or the like before he starts the recording operation. When the operator is ready to start forwarding the tape 3, the pause button P is pulled at the time X shown in FIG. 3 to move the pinch roll 9 towards the pinched position. At the same time the switch 16 is moved from the pause position (solid line) to the released position (dotted line) this cuases the pulse producer 11 to produce a pulse and in turn causes the delay circuit 10 to produce a single-shot pulse having a duration of $t_1$. This single-shot pulse provided through the OR circuit 12 to the NOR circuit 21 maintains the NOR circuit 21 in the off or de-energized state, regardless of the low level signal obtained from the photosensitive member 6. Since the high level signal from the delay circuit 10 lasts longer than the time the transparent tape 3b requires to move past the space between the light source 7 and the photosensitive member 6, the tape 3 is properly forwarded towards the take up reel 2b.

The second case is when the pause button P is pushed after the tape 3 has been forwarded for a small length which is less than the length of the transparent tape 3b, in other words, before the appearance of the magnetic tape 3a. In this case, the pushing of the pause button P causes the switch 16 to be turned from the released position (dotted line) to the pause position (solid line). A high level signal from the power source 19 is provided through the OR circuit 12 to the NOR circuit 21 so that the NOR circuit 21 does not operate the plunger 23 to interrupt the forward actuator means 24. Thus, the return of the pause button P in to the projected position properly forwards the tape 3 in manner similar to that described in the first case.

The third case is when the pause button P is pushed after the tape 3 has been forwarded for some length which is longer than the length of the transparent tape 3b. In this case the actuation of the pause button P moves the pinch roll 9 to the detached position so that the tape 3 is immediately stopped. Return of the pause button P back to the projected or pulled position further forwards the tape 3. In the third case the NOR circuit 21 is unceasingly provided with a high level signal from the photosensitive member 6 so that the plunger member 23 is maintained in the de-energized state regardless of signal change from the OR circuit 12.

As is fully understood from the foregoing description, the tape control system of the present invention has an advantage that the release of the pause button from the pause position immediately starts forwarding the tape even if the transparent tape is between the photosensitive member and the light source. Accordingly, when the tape recorded is placed in the pause position at the beginning of the tape to the check the condition of the tape recorder such as the level of the input signal the pause button can be simply released to immediately forward the tape. Thus, there is no problem such as missing a recording chance especially when the tape is positioned at the beginning.

Note that the opposite ends of the tape described as formed by transparent tape might be modified to be formed by electrically conductive tape. In this case, the light source 7 and the photosensitive member 6 provided to detect the end of the tape may be replaced by a suitable brush means which slidingly passes along the survace of the tape to detect the end of the tape by the conductivity of the electrically conductive portion.

Also note that the delay circuit 10 described as constructed of monostable multivibrator may be modified to be constructed of other types of multivibrators such as a bistable multivibrator.

Further note that the solenoid coil 22 described as provided for interrupting the forward actuator means 24 may be replaced by a suitable switch means which, upon receipt of a high level signal, turns off the driving means $M_1$ and $M_2$.

Although the present invention has been fully described by way of example with reference to the accompanying drawings, note that various changes and modifications are apparent to those skilled in the art. Therefore, unless such changes and modifications depart from the scope of the present invention, they should be construed as included therein.

What is claimed is:

1. In a tape recording and/or reproducing device of the type employing magnetic tape provided with a leader portion at opposite ends thereof, a tape control system comprising:
   a forwarding means for forwarding the tape;
   a pausing means for temporarily pausing the forwarding of the tape and for releasing said temporary pausing of the forwarding of the tape;
   a delay circuit connected to said forwarding means and said pausing means for producing an inhibit signal for a predetermined period of time after initiation of forwarding of the tape by either actuation of said forwarding means or release of said pausing means; and
   an automatic interuption means connected to said delay circuit adapted for detecting the leader portion of the tape and for interrupting the forwarding of the tape upon detection of the leading edge portion in the absence of said inhibit signal.

2. A tape control system as claimed in claim 1, wherein the leader portion is formed by transparent tape and the magnetic tape is formed by opaque tape, said interrupting means comprising a light emitting means and a photosensitive means positioned to have the tape move past the space formed between said light emitting means and said photosensitive means for producing a signal indicative of the presence of the leader portion when said photosensitive means receives light emitted from said light emitting means through the transparent tape and for producing a signal indicative of the presence of the magnetic tape when the light is intercepted by the opaque tape.

3. A tape control system as claimed in claim 1, wherein said predetermined period of time of said delay circuit is longer than the period of time necessary for the leader portion to move past said interrupting means when moving at the minimum tape speed.

4. A tape control system as claimed in claim 1, wherein said delay circuit comprises a monostable multivibrator.

5. In a tape recording and/or reproducing device of the type employing a magnetic tape provided with a leader portion at opposite ends thereof, having a forwarding roll movable between an operative position which is engaged with the tape for forwarding the tape and a pause position which is disengaged from the tape for temporarily stopping the tape from being forwarded and a driving means for driving the forwarding roll, a tape control system comprising:
   a forwarding means for forwarding the tape by acutating the driving means and placing the forwarding roll in the operative position;
   a detecting means for detecting the leader portion while the tape is forwarded and producing a leader portion detection signal indicative of the detection of the leader portion;
   an interrupting means for interrupting said forwarding means;
   a pausing means for pausing the tape by placing the forwarding roll in the pause position and for releasing the pausing of the tape by placing the forwarding roll in the operative position;
   a delay circuit connected to said forwarding means and said pausing means for producing a forwarding signal indicating that the tape is being forwarded a predetermined period of time after either the actuation of said forwarding means or the release of said pausing means;
   a NOR circuit having the inputs thereof connected to said delay circuit and said detecting means and the output thereof connected to said interrupting means for actuation of said interrupting means upon receipt of said leader portion detection signal and said forwarding signal, whereby said interrupting means is prevented from being actuated when said detecting means detects the leader portion for said predetermined period of time after actuation of said forwarding means or release of said pausing means.

* * * * *